(12) United States Patent
Ma et al.

(10) Patent No.: US 10,650,728 B2
(45) Date of Patent: May 12, 2020

(54) BACKLIGHT ASSEMBLY HAVING ELASTIC FRAME/BACKPLATE CLAMPING MEMBER, FOR USE IN DISPLAY DEVICE

(71) Applicant: BOE TECHNOLOGY GROUP CO., LTD., Beijing (CN)

(72) Inventors: Yongda Ma, Beijing (CN); Xinyin Wu, Beijing (CN); Yong Qiao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 105 days.

(21) Appl. No.: 15/762,357

(22) PCT Filed: Aug. 2, 2017

(86) PCT No.: PCT/CN2017/095600
§ 371 (c)(1),
(2) Date: Mar. 22, 2018

(87) PCT Pub. No.: WO2018/099117
PCT Pub. Date: Jun. 7, 2018

(65) Prior Publication Data
US 2019/0073942 A1 Mar. 7, 2019

(51) Int. Cl.
*G02F 1/1333* (2006.01)
*G09G 3/22* (2006.01)
(Continued)

(52) U.S. Cl.
CPC ............ *G09G 3/22* (2013.01); *G02F 1/1333* (2013.01); *G02F 1/133608* (2013.01);
(Continued)

(58) Field of Classification Search
CPC ... G02F 2001/133325; G02F 1/133608; G09F 2013/1881
See application file for complete search history.

(56) References Cited

U.S. PATENT DOCUMENTS 6,105,291 A * 8/2000 Gabrius .............. G09F 13/0413
40/572
7,172,331 B2 * 2/2007 Kuo .................. G02F 1/133608
362/362
(Continued)

FOREIGN PATENT DOCUMENTS

CN 103018960 A 4/2013
CN 103794146 A 5/2014
(Continued)

OTHER PUBLICATIONS

International Search Report dated Nov. 1, 2017 corresponding to application No. PCT/CN2017/095600.

*Primary Examiner* — Ismael Negron
(74) *Attorney, Agent, or Firm* — Nath, Goldberg & Meyer; Joshua B. Goldberg

(57) ABSTRACT

A backlight assembly includes a backplate defined by a bottom wall and a backplate sidewall provided with a first clamping slot; a frame defined by a display panel bearing portion and a frame side wall provided with a second clamping slot; and an elastic clamping member including a first clamping portion provided at the first clamping slot, a second clamping portion provided at the second clamping slot, and a connecting portion connecting the first clamping portion and the second clamping portion to secure the frame to the backplate.

12 Claims, 2 Drawing Sheets

(51) Int. Cl.
*G02F 1/13357* (2006.01)
*G02B 6/00* (2006.01)

(52) U.S. Cl.
CPC .......... *G02B 6/00* (2013.01); *G02F 1/133615* (2013.01); *G02F 2001/133325* (2013.01); *G02F 2201/46* (2013.01); *G02F 2201/465* (2013.01)

(56) References Cited

U.S. PATENT DOCUMENTS

| | | | | |
|---|---|---|---|---|
| 7,407,318 | B2 * | 8/2008 | Chang | G02F 1/133604 362/225 |
| 7,714,952 | B2 * | 5/2010 | Chang | G02B 6/0088 349/58 |
| 7,830,468 | B2 * | 11/2010 | Ahn | G02F 1/133308 349/58 |
| 7,924,360 | B2 * | 4/2011 | Cheng | G02F 1/133308 348/836 |
| 8,625,301 | B2 * | 1/2014 | Tang | H04M 1/0266 349/58 |
| 8,659,883 | B2 * | 2/2014 | Yu | G06F 1/1601 200/274 |
| 8,807,771 | B2 * | 8/2014 | Takeuchi | G02F 1/133603 362/97.1 |
| 9,151,975 | B2 * | 10/2015 | Yu | G02F 1/133308 |
| 10,180,533 | B2 * | 1/2019 | Horiguchi | G02B 6/0068 |
| 2006/0109674 | A1 * | 5/2006 | Hsaio | G02F 1/133608 362/551 |
| 2013/0208412 | A1 | 8/2013 | Takashima et al. | |
| 2013/0215356 | A1 * | 8/2013 | Yu | G02B 6/0088 349/58 |

FOREIGN PATENT DOCUMENTS

| | | |
|---|---|---|
| CN | 103913877 A | 7/2014 |
| CN | 204962437 U | 1/2016 |
| CN | 206191417 U | 5/2017 |

* cited by examiner

BACKLIGHT ASSEMBLY HAVING ELASTIC FRAME/BACKPLATE CLAMPING MEMBER, FOR USE IN DISPLAY DEVICE

CROSS-REFERENCE TO RELATED APPLICATION

This is a National Phase Application filed under 35 U.S.C. 371 as a national stage of PCT/CN2017/095600, filed Aug. 2, 2017, an application claiming the benefit of-Chinese Patent Application No. 201621309684.4, titled "Backlight Assembly and Display Device", filed on Dec. 1, 2016, the disclosure of which is hereby incorporated by reference in its entirety.

TECHNICAL FIELD

The disclosure relates to the field of display technology, in particular, to a backlight assembly and a display device including the backlight assembly.

BACKGROUND

In a design for a narrow bezel display device, doubleside taps are generally used to bond a display panel to a frame of a backlight assembly. However, when the display panel and the backlight assembly are assembled together, a fixation of the display panel is realized by means of a clamping connection and a screw locating connection between the frame of the backlight assembly and a backplate.

SUMMARY

A first aspect of the present disclosure relates to a backlight assembly including: a backplate including a first clamping slot; a frame including a frame side wall, the frame being used for bearing a display panel, and the frame side wall being provided with a second clamping slot therein; and an elastic clamping member including a first clamping portion, a second clamping portion and a connecting portion, the first clamping portion being provided at the first clamping slot, the second clamping portion being provided at the second clamping slot, and the connecting portion being connected with the first clamping portion and the second clamping portion, respectively, to connect the frame with the backplate together.

In some implementations, the backplate further includes a backplate bottom wall and a backplate side wall, the frame side wall is provided at an outer side of the backplate side wall, the first clamping slot is provided in the backplate side wall and penetrates through the backplate side wall, the second clamping slot penetrates through the frame side wall, and a position of the second clamping slot corresponds to a position of the first clamping slot, and the first clamping portion passes through the first clamping slot and the second clamping slot, and clamps with a clamping slot edge of the first clamping slot at an inner side of the backplate side wall, the second clamping portion clamps with a clamping slot edge of the second clamping slot at an outer side of the frame side wall, the connecting portion is provided in the first clamping slot and the second clamping slot, is in contact with the first clamping slot and the second clamping slot, and is connected with the first clamping portion and the second clamping portion, respectively.

In some implementations, the first clamping portion includes: a first hook which is provided at an end of the first clamping portion located at the inner side of the backplate side wall, the first hook extending in a first direction away from a center of the first clamping slot to be in contact with an inner side wall of the backplate side wall; and a second hook which is provided at an end of the first clamping portion located at the inner side of the backplate side wall, the second hook extending in a second direction away from a center of the first clamping slot to be in contact with the inner side wall of the backplate side wall.

In some implementations, the second clamping portion includes: a first stopping portion which is provided at an end of the second clamping portion located at the outer side of the frame side wall, the first stopping portion extending in the first direction away from the center of the second clamping slot to be in contact with an outer side wall of the frame side wall; a second stopping portion which is provided at the end of the second clamping portion located at the outer side of the frame side wall, the second stopping portion extending in the second direction away from the center of the second clamping slot to be in contact with the outer side wall of the frame side wall; and a fixing portion which is located at the outer side of the frame side wall, and is fixedly connected with the first stopping portion and the second stopping portion.

In some implementations, the first clamping portion includes: a first guiding portion; a second main stopping portion, the second main stopping portion and the first guiding portion being provided at an end of the first clamping portion located at the inner side of the backplate side wall, the second main stopping portion extending upwards to be in contact with an inner side wall of the backplate side wall, an end of the first guiding portion inclining towards a bottom of the first clamping slot, and another end of the first guiding portion being connected with the second main stopping portion; a second guiding portion; and a second secondary stopping portion, the second secondary stopping portion and the second guiding portion being provided at the end of the first clamping portion located at the inner side of the backplate side wall, the second secondary stopping portion extending downwards to be in contact with the inner side wall of the backplate side wall, an end of the second guiding portion inclining towards a top of the first clamping slot, and another end of the second guiding portion being connected with the second secondary stopping portion.

In some implementations, an end of the first guiding portion away from the second main stopping portion is connected with an end of the second guiding portion away from the second secondary stopping portion, and the second clamping portion includes: a third main stopping portion which is provided at an end of the second clamping portion located at the outer side of the frame side wall, and extends upwards to be in contact with the outer side wall of the frame side wall; and a third secondary stopping portion which is provided at the end of the second clamping portion located at the outer side of the frame side wall, and extends downwards to be in contact with the outer side wall of the frame side wall.

In some implementations, the backplate includes: a backplate bottom wall; and a backplate side wall, the frame side wall is provided at an outer side of the backplate side wall, and the first clamping slot is located at the backplate bottom wall and penetrates through the backplate bottom wall, the second clamping slot penetrates through the frame side wall, the connecting portion is provided around an outer side of the backplate bottom wall and an outer side of the frame side wall and is connected with the first clamping portion and the second clamping portion, respectively.

In some implementations, the backlight assembly further includes a reflector which is provided on an inner surface of the backplate bottom wall, the first clamping portion includes a third hook which is provided at an end of the first clamping portion located in a gap between the backplate bottom wall and the reflector, and the third hook extends along the inner surface of the backplate bottom wall and is in contact with the inner surface of the backplate bottom wall, and the second clamping portion includes a fourth hook which is provided at an end of the second clamping portion located in a gap between the frame side wall and an outer side wall of the backplate side wall, and the fourth hook extends downwards and is in contact with an inner side wall of the frame side wall.

In some implementations, the frame side wall includes: a second clamping slot setting site; and a periphery portion, the second clamping slot is provided at the second clamping slot setting site, and a thickness of the frame at the second clamping slot setting site is larger than that of the frame at the periphery portion.

In some implementations, a difference between the thickness of the frame at the second clamping slot setting site and the thickness of the frame at the periphery portion is smaller than a distance from an outer surface of the connecting portion to an outer surface of the periphery portion.

In some implementations, the first clamping portion, the second clamping portion and the connecting portion are formed integrally by a same material.

In some implementations, the frame includes a bearing portion which is located at a top of the frame side wall and is used for bearing a display panel, the bearing portion is provided thereon with a reception step for receiving a connecting portion between the display panel and the bearing portion.

A second aspect of the present disclosure relates to a display device which includes a display panel and a backlight assembly, the backlight assembly is the backlight assembly as mentioned above.

BRIEF DESCRIPTION OF THE FIGURES

Drawings, which constitute a part of the description, are provided to explain the present disclosure in conjunction with the following specific implementations so as to provide a further understanding, not a limitation, of the present disclosure. In the drawings.

DETAILED DESCRIPTION

Figure 1:
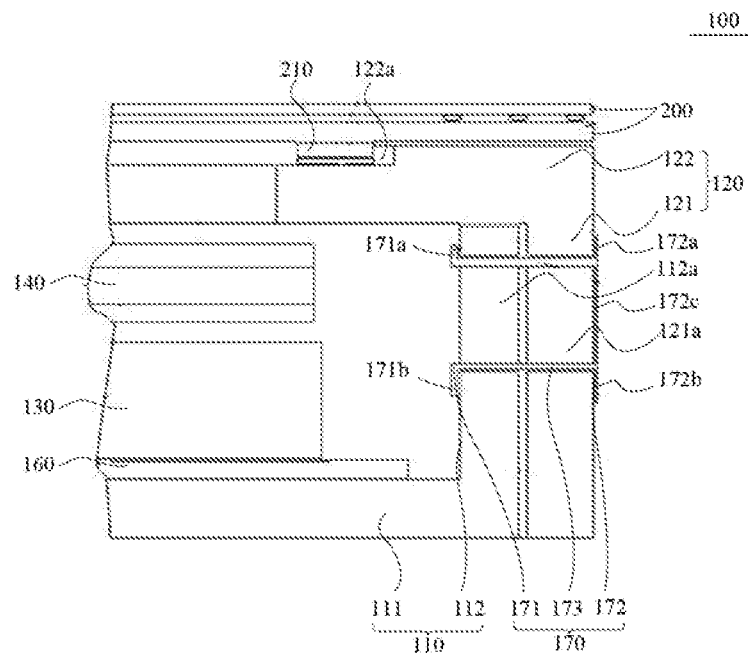
FIG. 1 is a schematic diagram of a structure of a backlight assembly in an embodiment.

The specific implementations of the present disclosure will be described in detail below in conjunction with the drawings. It should be appreciated that the specific implementations as described herein are intended to describe and explain the present disclosure, not to limit the present disclosure.

Referred to FIGS. 1, 2, 3 and 4, in a first aspect of the present disclosure, a backlight assembly 100 is provided. The backlight assembly includes a backplate 110, a frame 120, a light guide plate 130, an optical film material 140, a light source 150, and a reflector 160. The backplate 110 includes a backplate bottom wall 111 and a backplate side wall 112. The frame 120 includes a frame side wall 121 and a bearing portion 122 which is located at a top of the frame side wall 121 and is used for bearing a display panel 200. The frame side wall 121 is provided at an outer side of the backplate side wall 112. The reflector 160 is provided at an inner side of the backplate bottom wall 111. That is, the reflector 160 is provided on an inner surface of the backplate bottom wall, the light guide plate 130 is provided above the reflector 160, the optical film material 140 is provided at a light outgoing side of the light guide plate 130, and the light source 150 is provided at a light incoming side of the light guide plate 130.

A first clamping slot (111a, 112a) is provided in the above backplate 110, and a second clamping slot 121a is provided in the frame side wall 121.

The backlight assembly 100 further includes an elastic clamping member 170. The elastic clamping member 170 includes a first clamping portion 171, a second clamping portion 172 and a connecting portion 173. The first clamping portion 171 is provided at the first clamping slot (111a, 112a), the second clamping portion 172 is provided at the second clamping slot 121a, and the connecting portion 173 is connected with the first clamping portion 171 and the second clamping portion 172, respectively, to connect the frame 120 with the backplate 110 together.

In the backlight assembly 100 of the present embodiment, the elastic clamping member 170 is provided to connect the backplate 110 with the frame 120 together. When the backlight assembly 100 and the display panel 200 are assembled to form a display device, even if relative motion occurs between the display panel 200 and the backlight assembly 100 and generates an impacting force, since the elasticity of the elastic clamping member results in a buffer effect, the impacting force can be absorbed, and the backlight assembly 100 and the display panel 200 will not be damaged; when the impacting force disappears, the backlight assembly 100 can return back to a preset initial position. Meanwhile, the provided first clamping slot (111a, 112a) and second clamping slot 121a further have a positioning function so that the backlight assembly 100 and the display panel 200 can be positioned accurately so as to be assembled properly when they are assembled to form the display device.

It should be noted that, the specific structures and shapes of the first clamping portion 171, the second clamping portion 172 and the connecting portion 173 are not particularly limited, as long as the first clamping portion 171 is capable of clamping with the first clamping slot (111a, 112a), the second clamping portion 172 is capable of clamping with the second clamping slot 121a, and the connecting portion 173 is connected with the first clamping portion 171 and the second clamping portion 172, respectively, so as to fix the backplate 110 to the frame 120.

Continue to refer to FIG. 1, it shows a first type of setting positions of the first clamping slot and the second clamping slot. In some implementations, the first clamping slot 112a may be provided in the backplate side wall 112 and penetrates through the backplate side wall 112, and the second clamping slot 121a penetrates through the frame side wall 121. A position of the second clamping slot 121a corresponds to a position of the first clamping slot 112a.

In the embodiment of such structure, the first clamping portion 171 passes through the first clamping slot 112a and the second clamping slot 121a, and clamps with a clamping slot edge of the first clamping slot 112a at an inner side of the backplate side wall 112. The second clamping portion 172 passes through the first clamping slot 112a and the second clamping slot 121a, and clamps with a clamping slot edge of the second clamping slot 121a at an outer side of the frame side wall 121. Meanwhile, the connecting portion 173 is provided in the first clamping slot 112a and the second clamping slot 121a, is in contact with the first clamping slot 112a and the second clamping slot 121a, and is connected with the first clamping portion 171 and the second clamping portion 172, respectively, so as to connect the backplate 110 with the frame 120 together.

In the backlight assembly 100 of the present embodiment, the position of the first clamping slot 112a corresponds to the position of the second clamping slot 121a, which can achieve that the backplate 110 and the frame 120 are connected with each other at a same position and such structure is simple. Meanwhile, in the case that the backlight assembly 100 and the display panel 200 are assembled to form a display device, when relative motion occurs between the display panel 200 and the backlight assembly 100 or occurs between the backplate 110 and the frame 120 of the backlight assembly 100, an impacting force is generated; in this case, the impacting force can be absorbed by the connecting portion 173 located in the first clamping slot 112a and the second clamping slot 121a, which achieves a buffer effect and thus the backlight assembly 100 or the display device can be protected. When the impacting force disappears, the connecting portion 173 can return back to a preset position. In this case, the display panel 200 or the backplate 110 and the frame 120 of the backlight assembly 100 can also return back to a preset position.

Continue to refer to FIG. 1, it shows a first specific structure of the first clamping portion 171. In some implementations, the first clamping portion 171 includes a first hook 171a and a second hook 171b. The first hook 171a is provided at an end of the first clamping portion 171 located at the inner side of the backplate side wall 112, and the first hook 171a extends upwards (i.e., in a first direction away from a center of the first clamping slot) to be in contact with an inner side wall of the backplate side wall 112. The second hook 171b is provided at an end of the first clamping portion 171 located at the inner side of the backplate side wall 112, and the second hook 171b extends downwards (i.e., in a second direction away from a center of the first clamping slot) to be in contact with the inner side wall of the backplate side wall 112.

In the backlight assembly 100 of the present embodiment, a structure is employed in which the first hook 171a and the second hook 171b are provided at an end of the first clamping portion 171 located at the inner side of the backplate side wall 112. Such structure can clamp with the clamping slot even better, and thus can connect the frame 120 with the backplate 110 more steadily.

It should be appreciated that, in the above backlight assembly 100, since the connecting portion 173 is in contact with the first clamping slot 112a and the second clamping slot 121a, it should include at least a part which is in contact with upper side walls of the first and second clamping slots 112a and 121a so as to be connected with the first hook 171a, and a part which is in contact with lower side walls of the first and second clamping slots 112a and 121a so as to be connected with the second hook 171b.

Continue to refer to FIG. 1, in some implementations, the second clamping portion 172 includes a first stopping portion 172a, a second stopping portion 172b and a fixing portion 172c. The first stopping portion 172a is provided at an end of the second clamping portion 172 located at the outer side of the frame side wall 121, and the first stopping portion 172a extends upwards (i.e., in the first direction away from the center of the second clamping slot) to be in contact with an outer side wall of the frame side wall 121. The second stopping portion 172b is provided at the end of the second clamping portion 172 located at the outer side of the frame side wall 121, and the second stopping portion 172b extends downwards (i.e., in the second direction away from the center of the second clamping slot) to be in contact with the outer side wall of the frame side wall 121. The fixing portion 172c is located at the outer side of the frame side wall 121, and is fixedly connected with the first stopping portion 172a and the second stopping portion 172b.

In the backlight assembly 100 of the present embodiment, the first stopping portion 172a and the second stopping portion 172b are provided at the end of the second clamping portion 172 located at the outer side of the frame side wall 121, and the fixing portion 172c is fixedly connected with the first stopping portion 172a and the second stopping portion 172b, respectively. The two stopping portions can avoid an ineffective clamping caused by the falling of the elastic clamping member 170 out of the clamping slot. As a result, the backlight assembly 100 having such clamping structure can make the connection between the backplate 110 and the frame 120 more steadily, and can absorb an impacting force even better when relative motion occurs between the backplate 110 and the frame 120 due to an external force or some other reasons.

Figure 2:
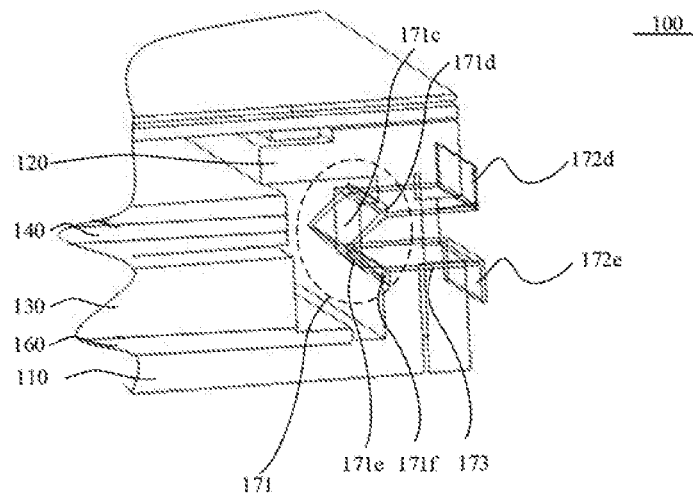
FIG. 2 is a schematic diagram of a structure of a backlight assembly in another embodiment.

Further referring to FIG. 2, it shows a second specific structure of the first clamping portion 171 and the second clamping portion 172. In some implementations, the first clamping portion 171 include a first guiding portion 171c, a second main stopping portion 171d, a second guiding portion 171e and a second secondary stopping portion 171f.

The first guiding portion 171c and the second main stopping portion 171d as mentioned above are provided at an end of the first clamping portion 171 located at the inner side of the backplate side wall 112. The second main stopping portion 171d extends upwards to be in contact with an inner side wall of the backplate side wall 112. An end of the first guiding portion 171c inclines towards a bottom of the first clamping slot 112a, and another end of the first guiding portion 171c is connected with the second main stopping portion 171d.

The second guiding portion 171e and the second secondary stopping portion 171f as mentioned above are provided at the end of the first clamping portion 171 located at the inner side of the backplate side wall 112. The second secondary stopping portion 171f extends downwards to be in contact with the inner side wall of the backplate side wall 112. An end of the second guiding portion 171e inclines towards a top of the first clamping slot 112a, and another end of the second guiding portion 171e is connected with the second secondary stopping portion 171f.

In the backlight assembly 100 of the present embodiment, on one hand, since the end of the first clamping portion 171 located at the inner side of the backplate side wall 112 has the above guiding portion, and the guiding portion inclines towards the inside of the first clamping slot 112a, it is convenient for the elastic clamping member 170 to be assembled into the backlight assembly 100. On the other hand, since there is further a stopping portion at the end of the first clamping portion 171 located at the inner side of the backplate side wall 112, a fixing connection between the backplate 110 and the frame 120 can also be achieved.

Continue to refer to FIG. 2, in some implementations, an end of the first guiding portion 171c away from the second main stopping portion 171d is connected with an end of the second guiding portion 171e away from the second secondary stopping portion 171f. That is to say, the end of the first clamping portion 171 at the inner side of the backplate side wall 112 is an integral structure.

In the present embodiment, the second clamping portion 172 further comprises a third main stopping portion 172d and a third secondary stopping portion 172e. The third main stopping portion 172d is provided at an end of the second clamping portion 172 located at the outer side of the frame side wall 121, and extends upwards to be in contact with the outer side wall of the frame side wall 121. The third secondary stopping portion 172e is provided at the end of the second clamping portion 172 located at the outer side of the frame side wall 121, and extends downwards to be in contact with the outer side wall of the frame side wall 121.

It should be appreciated that, the end of the first clamping portion 171 at the inner side of the backplate side wall 112 may not be an integral structure. In this case, the second clamping portion 172 should further include the above fixing portion 172c. The fixing portion 172c is connected with the third main stopping portion 172d and the third secondary stopping 172e, respectively, so as to form an integral structure, and the fixing connection of the backplate 110 and the frame 120 is achieved.

In the backlight assembly 100 of the present embodiment, an ineffective clamping caused by the falling of the elastic clamping member 170 from the inside of the clamping slot can be further avoided, and the backplate 110 and the frame 120 can be connected with each other more effectively.

Figure 3:
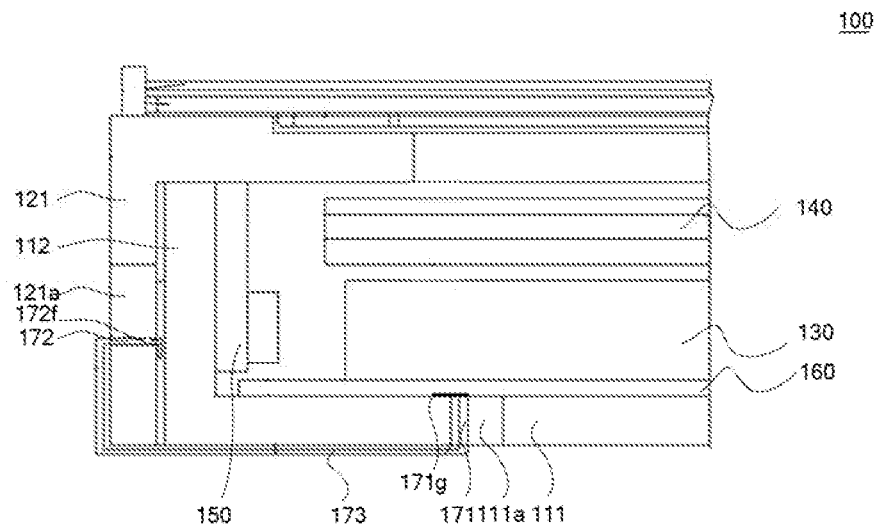
FIG. 3 is a schematic diagram of a structure of a backlight assembly in further another embodiment.

Further referring to FIG. 3, it shows a second type setting positions of the first clamping slot and the second clamping slot. In some implementations, the first clamping slot 111a is located in the backplate bottom wall 111 and penetrates through the backplate bottom wall 111. The second clamping slot 121a penetrates through the frame side wall 121. The connecting portion 173 is provided around an outer side of the backplate bottom wall 111 and an outer side of the frame side wall 121 and is connected with the first clamping portion 171 and the second clamping portion 172, respectively.

In the backlight assembly 100 of the present embodiment, on one hand, since the first clamping slot 111a penetrates through the backplate bottom wall 111 and the second clamping slot 121a penetrates through the frame side wall 121, it is avoided that the clamping slots are provided at a same position in the backlight assembly 100 and thus the strength of the backlight assembly 100 can be improved effectively. On the other hand, since the connecting portion 173 is provided around an outer side of the backplate bottom wall 111 and an outer side of the frame side wall 121, the length of the connecting portion 173 is increased. When the backlight assembly 121 is subject to a large impacting force due to an external force or relative motion under other stress conditions, the elastic clamping member 170 can absorb the large impacting force.

Figure 4:
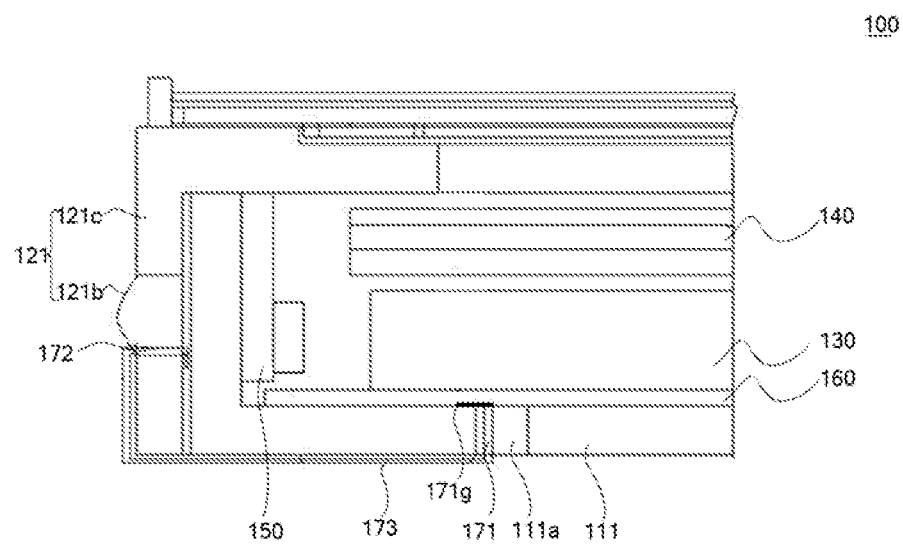
FIG. 4 is a schematic diagram of a structure of a backlight assembly in still another embodiment.

Further referring to FIGS. 3 and 4, they show a second type of setting positions of the first clamping slot and the second clamping slot. In some implementations, in such setting positions of clamping slots, the first clamping portion 171 includes a third hook 171g. The third hook 171g is provided at an end of the first clamping portion 171 located in a gap between the backplate bottom wall 111 and the reflector 160, and the third hook 171g extends along the inner surface of the backplate bottom wall and is in contact with the inner surface of the backplate bottom wall.

The second clamping portion 172 includes a fourth hook 172f. The fourth hook 172f is provided at an end of the second clamping portion 172 located in a gap between the frame side wall 121 and an outer side wall of the backplate side wall 112, and the fourth hook 172f extends downwards and is in contact with an inner side wall of the frame side wall 121.

In the backlight assembly 100 of the present embodiment, in the case that the first clamping slot 111a and the second clamping slot 121a are located at the second type of setting positions as mentioned above, the third hook 171g and the fourth hook 172f cause that the first clamping portion 171 and the second clamping portion 172 can clamp with the clamping slots even better, thereby achieving a steady connection between the frame 120 and the backplate 110.

Continue to refer to FIG. 4, in some implementations, the frame side wall 121 includes a second clamping slot setting site 121b and a periphery portion 121c. The second clamping slot 121a is provided at the second clamping slot setting site 121b, and a thickness of the frame 120 at the second clamping slot setting site 121b (i.e., the thickness in a left-right direction in the figure) is larger than that of the frame 120 at the periphery portion 121c.

In the backlight assembly 100 of the present embodiment, the thickness of the frame 120 at the second clamping slot setting site 121b is increased, which can prevent the frame 120 from being damaged at this position, when the backlight assembly 100 is subject to a large impacting force.

In some implementations, in order to achieve the narrow bezel design, a difference between the thickness of the frame 120 at the above second clamping slot setting site 121b and the thickness of the frame 120 at the periphery portion 121c is smaller than a distance from an outer surface of the connecting portion 173 to an outer surface of the periphery portion 121c.

In some implementations, the first clamping portion 171, the second clamping portion 172 and the connecting portion 173 are formed integrally by a same material.

In the backlight assembly 100 of the present embodiment, the first clamping portion 171, the second clamping portion 172 and the connecting portion 173 are formed integrally by a same material, that is, the elastic clamping member 170 has a structure formed integrally, which saves the manufacture cost, and can effectively absorb the impacting force caused when the display panel 200 is assembled.

In some implementations, in order to assembly the display panel 200 more conveniently, the above mentioned bearing portion 122 is provided thereon with a reception step 122a. The reception step 122a is used for receiving a connecting portion 210 between the display panel and the bearing portion.

A second aspect of the present disclosure relates to a display device (not shown in figures). The display device includes a display panel 200 and a backlight assembly 100. The backlight assembly 100 includes the backlight assembly 100 with any structure mentioned above. The display panel 200 is in contact with the top of the frame side wall 121 and the bearing portion 122.

In the display device of the present embodiment, since the above mentioned backlight assembly 100 is employed, since the elasticity of the elastic clamping member 170 results in a buffer effect, an impacting force generated when relative motion occurs between the display panel 200 and the backlight assembly 100 will be absorbed, and in turn the backlight assembly 100 and the display panel 200 are prevent from being damaged. Meanwhile, the first clamping slot (111a, 112a) and the second clamping slot 121a as provided above further have a positioning function so that the backlight assembly 100 and the display panel 200 can be positioned accurately so as to be assembled properly when they are assembled to form a display device.

In some implementations, in order to further achieve the narrow bezel design, an edge of the display panel 200 corresponds to an edge of a top of the frame side wall 121, and at least one edge of the display panel 200 and the corresponding edge of the top of the frame side wall 121 are apart with a distance less than 1 mm.

The above display device may be an electronic device such as a display, a GPS navigator, a mobile, a laptop, a tablet, and so on.

It will be appreciated that above implementations are only exemplary implementations for illustrating the principle of the disclosure, and the present disclosure is not limited to them. An ordinary person skilled in the art may make various modifications and improvements without departing from the spirit and essence of the present disclosure. These modifications and the improvements should be considered within the protective scope of the present disclosure.

What is claimed is:

1. A backlight assembly, comprising:
a backplate comprising a first clamping slot;
a frame comprising a frame side wall, the frame being configured for bearing a display panel, and the frame side wall being provided with a second clamping slot therein; and
an elastic clamping member comprising a first clamping portion, a second clamping portion and a connecting portion, the first clamping portion being provided at the first clamping slot, the second clamping portion being provided at the second clamping slot, and the connecting portion being connected with the first clamping portion and the second clamping portion, respectively, to connect the frame with the backplate together,
wherein the backplate further comprises:
a backplate bottom wall; and
a backplate side wall, wherein
the frame side wall is provided at an outer side of the backplate side wall, the first clamping slot is provided in the backplate side wall and penetrates through the backplate side wall, the second clamping slot penetrates through the frame side wall, and a position of the second clamping slot corresponds to a position of the first clamping slot, and wherein
the first clamping portion passes through the first clamping slot and the second clamping slot, and clamps with a clamping slot edge of the first clamping slot at an inner side of the backplate side wall, the second clamping portion clamps with a clamping slot edge of the second clamping slot at an outer side of the frame side wall, the connecting portion is provided in the first clamping slot and the second clamping slot, is in contact with the first clamping slot and the second clamping slot, and is connected with the first clamping portion and the second clamping portion, respectively, and
wherein the first clamping portion comprises:
a first guiding portion;
a second main stopping portion, the second main stopping portion and the first guiding portion being provided at an end of the first clamping portion located at the inner side of the backplate side wall, the second main stopping portion extending upwards to be in contact with an inner side wall of the backplate side wall, an end of the first guiding portion inclining towards a bottom of the first clamping slot, and another end of the first guiding portion being connected with the second main stopping portion;
a second guiding portion; and
a second secondary stopping portion the second secondary stopping portion and the second guiding portion being provided at the end of the first clamping portion located at the inner side of the backplate side wall, the second secondary stopping portion extending downwards to be in contact with the inner side wall of the backplate side wall, an end of the second guiding portion inclining towards a top of the first clamping slot, and another end of the second guiding portion being connected with the second secondary stopping portion.

2. The backlight assembly of claim 1, wherein the first clamping portion, the second clamping portion and the connecting portion are formed integrally by a same material.

3. The backlight assembly of claim 1, wherein the frame comprises:
a bearing portion which is located at a top of the frame side wall and is configured for bearing a display panel, wherein
the bearing portion is provided thereon with a reception step for receiving a connecting portion between the display panel and the bearing portion.

4. A display device, comprising a display panel and a backlight assembly, wherein the backlight assembly is the backlight assembly of claim 1.

5. The backlight assembly of claim 1, wherein an end of the first guiding portion away from the second main stopping portion is connected with an end of the second guiding portion away from the second secondary stopping portion, and the second clamping portion comprises:
a third main stopping portion which is provided at an end of the second clamping portion located at the outer side of the frame side wall, and extends upwards to be in contact with the outer side wall of the frame side wall; and
a third secondary stopping portion which is provided at the end of the second clamping portion located at the outer side of the frame side wall, and extends downwards to be in contact with the outer side wall of the frame side wall.

6. A display device, comprising a display panel and a backlight assembly, wherein the backlight assembly is the backlight assembly of claim 5.

7. A backlight assembly, comprising:
a backplate comprising a first clamping slot:
a frame comprising a frame side wall, the frame being configured for bearing a display panel, and the frame side wall being provided with a second clamping slot therein; and
an elastic clamping member comprising a first clamping portion, a second clamping portion and a connecting portion, the first clamping portion being provided at the first clamping slot the second clamping portion being provided at the second clamping slot, and the connecting portion being connected with the first clamping portion and the second clamping portion, respectively, to connect the frame with the backplate, wherein the backplate comprises:
a backplate bottom wall; and
a backplate side wall, wherein
the frame side wall is provided at an outer side of the backplate side wall, and wherein
the first clamping slot is located at the backplate bottom wall and penetrates through the backplate bottom wall, the second clamping slot penetrates through the frame side wall, the connecting portion is provided around an outer side of the backplate bottom wall and an outer side of the frame side wall and is connected with the first clamping portion and the second clamping portion, respectively, and wherein the backlight assembly further comprises a reflector which is provided on an inner surface of the backplate bottom wall, wherein the first clamping portion comprises a third hook which is provided at an end of the first clamping portion located in a gap between the backplate bottom wall and the reflector, and the third hook extends along the inner surface of the backplate bottom wall and is in contact with the inner surface of the backplate bottom wall, and wherein the second clamping portion comprises a fourth hook which is provided at an end of the second clamping portion located in a gap between the frame side wall and an outer side wall of the backplate side wall, and the fourth hook extends downwards and is in contact with an inner side wall of the frame side wall.

8. A display device, comprising a display panel and a backlight assembly, wherein the backlight assembly is the backlight assembly of claim 7.

9. The backlight assembly of claim 7, wherein the first clamping portion, the second clamping portion and the connecting portion are formed integrally by a same material.

10. The backlight assembly of claim 7, wherein the frame comprises:

a bearing portion which is located at a top of the frame side wall and is configured for bearing a display panel, wherein the bearing portion is provided thereon with a reception step for receiving a connecting portion between the display panel and the bearing portion.

11. The backlight assembly of claim 7, wherein the frame side wall comprises:

a second clamping slot setting site; and a periphery portion, wherein the second clamping slot is provided at the second clamping slot setting site, and a thickness of the frame at the second clamping slot setting site is larger than that of the frame at the periphery portion.

12. The backlight assembly of claim 11, wherein a difference between the thickness of the frame at the second clamping slot setting site and the thickness of the frame at the periphery portion is smaller than a distance from an outer surface of the connecting portion to an outer surface of the periphery portion.

* * * * *